US011018949B2

(12) United States Patent
Ramasamy et al.

(10) Patent No.: US 11,018,949 B2
(45) Date of Patent: May 25, 2021

(54) SYSTEM FOR GENERATING AN ARCHITECTURE DIAGRAM

(71) Applicant: Accenture Global Solutions Limited, Dublin (IE)

(72) Inventors: Manoharan Ramasamy, Bangalore (IN); Nitin Madhukar Sawant, Mumbai (IN); Vijay Baskaran, Chennai (IN); Ganesh Dadasaheb Waghmale, Pune (IN); Abhishek Kumar Pandey, Bokaro (IN); Balasubramanyam Besta, Papampeta (IN); Rakesh Singh Kanyal, Gurgaon (IN); Anil Kumar, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/730,495

(22) Filed: Oct. 11, 2017

(65) Prior Publication Data
US 2019/0020550 A1    Jan. 17, 2019

(30) Foreign Application Priority Data
Jul. 14, 2017    (IN) .............................. 201741025086

(51) Int. Cl.
*H04L 12/24*    (2006.01)
*G06K 9/62*    (2006.01)
(Continued)

(52) U.S. Cl.
CPC ............ *H04L 41/142* (2013.01); *G06F 30/00* (2020.01); *G06F 30/18* (2020.01); *G06K 9/6256* (2013.01);
(Continued)

(58) Field of Classification Search
CPC ....... H04L 41/142; H04L 41/12; H04L 41/16; H04L 41/22; G06F 17/509; G06K 9/6256; G06K 9/6267
See application file for complete search history.

(56) References Cited

U.S. PATENT DOCUMENTS

| 5,276,789 A | * | 1/1994 | Besaw | .................... G06F 30/18 345/440 |
| 7,885,902 B1 | | 2/2011 | Shoemaker et al. | |

(Continued)

OTHER PUBLICATIONS

Examination Report No. 1 for Australian Patent Application No. 2018205084, dated Aug. 22, 2018, pp. 1-8.
(Continued)

*Primary Examiner* — Tonia L Dollinger
*Assistant Examiner* — Jihad K Boustany
(74) *Attorney, Agent, or Firm* — Brinks Gilson & Lione (57) ABSTRACT

A system for generating an architecture diagram includes an input processor, a machine learning processor, and an advice generator. The input processor is configured to receive, from a terminal, entity data associated with a plurality of entities of an architecture and path data associated with a plurality of paths that correspond to interconnections between the plurality of entities. The machine learning processor utilizes a training dataset to assess whether the entities defined by the entity data are correctly interconnected as defined by the path data. The advice generator receives the assessment from the machine learning processor, prepares a recommendation based on the assessment, and communicates the recommendation to the terminal. User feedback is represented in the training data to improve the relevancy of the recommendation.

14 Claims, 8 Drawing Sheets

(51) Int. Cl.
*G06F 30/00* (2020.01)
*G06F 30/18* (2020.01)
*G06F 111/12* (2020.01)

(52) U.S. Cl.
CPC ............ *G06K 9/6267* (2013.01); *H04L 41/12* (2013.01); *H04L 41/145* (2013.01); *H04L 41/16* (2013.01); *H04L 41/22* (2013.01); *G06F 2111/12* (2020.01)

(56) References Cited

U.S. PATENT DOCUMENTS

| | | | |
|---|---|---|---|
| 7,966,282 B2 | 6/2011 | Pinckney et al. | |
| 9,960,956 B1* | 5/2018 | Johnson | H04L 41/12 |
| 2001/0049594 A1* | 12/2001 | Kievans | H04L 41/12 |
| | | | 703/14 |
| 2005/0154790 A1* | 7/2005 | Nagata | H04L 12/4641 |
| | | | 709/223 |
| 2008/0091387 A1 | 4/2008 | Yamazaki et al. | |
| 2009/0059814 A1* | 3/2009 | Nixon | H04W 16/18 |
| | | | 370/254 |
| 2011/0202317 A1 | 8/2011 | Brown | |
| 2013/0227116 A1* | 8/2013 | Radhakrishnan | H04L 41/0823 |
| | | | 709/224 |
| 2015/0067159 A1* | 3/2015 | Johnston | H04L 41/0866 |
| | | | 709/224 |
| 2015/0301866 A1* | 10/2015 | Hotta | G06F 11/00 |
| | | | 718/103 |
| 2015/0333992 A1* | 11/2015 | Vasseur | H04L 12/4641 |
| | | | 370/252 |
| 2016/0182329 A1* | 6/2016 | Armolavicius | H04L 45/02 |
| | | | 370/230 |
| 2016/0292769 A1 | 10/2016 | Colson et al. | |
| 2016/0323306 A1* | 11/2016 | Filippi | G06F 16/3331 |
| 2016/0328406 A1* | 11/2016 | Convertino | G06F 3/04842 |
| 2017/0063902 A1* | 3/2017 | Muddu | G06F 16/254 |
| 2017/0353991 A1* | 12/2017 | Tapia | H04L 41/0631 |
| 2018/0157981 A1* | 6/2018 | Albertson | G06N 3/006 |
| 2018/0309636 A1* | 10/2018 | Strom | H04L 41/147 |
| 2018/0331908 A1* | 11/2018 | Gal | H04L 69/16 |

OTHER PUBLICATIONS

Examination Report No. 3 in Australian Application No. 2018205084, dated Aug. 7, 2019, 4 pages.
First Examination Report issued for Indian Application No. 201741025086 dated Jul. 14, 2020, 6 pages.

* cited by examiner

```
{
"objects": [
{"objid": "111", "defaultobjectid": "92", "defaultobjecttitle": "Client", "defaultobjectcatagory": "Architecture", "groupid": "", "content": "Sample"},
{"objid": "112", "defaultobjectid": "53", "defaultobjecttitle": "Firewall", "defaultobjectcatagory": "Networking", "groupid": "", "content": "Sample"},
{"objid": "114", "defaultobjectid": "107", "defaultobjecttitle": "Application", "defaultobjectcatagory": "Architecture", "groupid": "", "content": "Sample"},
{"objid": "115", "defaultobjectid": "30", "defaultobjecttitle": "Database", "defaultobjectcatagory": "Servers", "groupid": "", "content": "Sample"},
{"objid": "116", "defaultobjectid": "39", "defaultobjecttitle": "Network", "defaultobjectcatagory": "Servers", "groupid": "", "content": "Sample"}], "paths": [
{"pathid": "111", "default_pathid": 0, "default_path_title": "arrow", "source": "111", "target": "112", "reverse": "onearrow"},
{"pathid": "112", "default_pathid": 0, "default_path_title": "arrow", "source": "111", "target": "114", "reverse": "onearrow"},
{"pathid": "113", "default_pathid": 0, "default_path_title": "arrow", "source": "111", "target": "115", "reverse": "onearrow"},
{"pathid": "114", "default_pathid": 0, "default_path_title": "arrow", "source": "111", "target": "116", "reverse": "onearrow"}],
"imagetitle": "Sample", "imagecategory": "Network Infrastructure"}
```

Fig. 4A

| User | Computer | Tablet | Cloud | Firewall | Router | Server | Load Balancer | Category |
|---|---|---|---|---|---|---|---|---|
| | 36 | 38 | 12 | 54 | | 55 | | 75 |
| | 36 | 38 | 12 | 54 | | 55 | 75 | 75 |
| | | | 12 | | | | 75 | 54 |
| 70 | | | | 22 | 22 | | | -1 |
| 70 | 36 | | 12 | | | | 75 | -1 |
| | | | | | | | | 0 |

SYSTEM FOR GENERATING AN ARCHITECTURE DIAGRAM

BACKGROUND

Related Applications

This application claims priority under 35 U.S.C. § 119 to Indian Patent Application No. 201741025086, filed Jul. 14, 2017.

Field

This application generally relates to the implementation of large computer systems. In particular, this application describes a system for generating an architecture diagram that describes the computer system.

Description of Related Art

System architectures are usually represented in the form of schematic diagrams that illustrate various objects and the interconnections between the objects. The schematic diagrams are usually prepared by system architects of a development team and typically form the basis for the implementation of the system by developers and engineers of the development team in that the schematic will be referred to during implementation.

Unfortunately, during the implementation phase, problems in the selection and/or interconnection of objects may be determined. The problems may be remedied by the developers and engineers without any regard to updating the schematic. This all but guarantees that the same problems will be made if the same schematics were to be used in the implementation of a new system.

However, even when the developers and engineers revise the schematic to correct the erroneous portions, the lessons learned from implementation of the system may not be conveyed to future architects creating architects for entirely different systems. This will likely lead to the same problems being made in future system implementations.

BRIEF SUMMARY

In one aspect, a system for generating an architecture diagram includes an input processor, a machine learning processor, and an advice generator. The input processor is configured to receive, from a terminal, entity data associated with a plurality of entities of an architecture and path data associated with a plurality of paths that correspond to interconnections between the plurality of entities. The machine learning processor utilizes a training dataset to assess whether the entities defined by the entity data are correctly interconnected as defined by the path data. The advice generator receives the assessment from the machine learning processor, prepares a recommendation based on the assessment, and communicates the recommendation to the terminal.

In a second aspect, a non-transitory computer readable medium includes instruction code that facilitates generating an architecture diagram. The instruction code is executable by a machine for causing the machine to perform acts that include receiving, from a terminal, entity data associated with a plurality of entities of an architecture and path data associated with a plurality of paths that correspond to interconnections between the plurality of entities. The instruction code is further executable to cause the machine to control a machine learning processor that utilizes a training dataset to assess whether the entities defined by the entity data are correctly interconnected as defined by the path data. The instruction code is further executable to cause the machine to prepare a recommendation based on the assessment and to communicate the recommendation to the terminal.

In a third aspect, a method for generating an architecture diagram includes receiving, by an input processor and from a terminal, entity data associated with a plurality of entities of an architecture and path data associated with a plurality of paths that correspond to interconnections between the plurality of entities. The method also includes controlling a machine learning processor that utilizes a training dataset to assess whether the entities defined by the entity data are correctly interconnected as defined by the path data. The method also includes preparing, by an advice generator, a recommendation based on the assessment, and communicating the recommendation to the terminal.

DETAILED DESCRIPTION

The embodiments described below overcome the problems described in the background by providing a system that facilitates creation of an architecture diagram by a system architect and that provides feedback to the system architect to help the system architect conform the architecture diagram to best practices.

The system includes learning capabilities that improve the accuracy/relevance of feedback provided to the system architect. Therefore, over time, the system helps to minimize the number of interactions necessary to generate a final version of an architecture diagram. This improves, among other things, cost and time to market. It also lowers the overall hardware demands in that fewer versions of the architecture diagram are required, which allows for more efficient memory utilization of the system.

Figure 1:
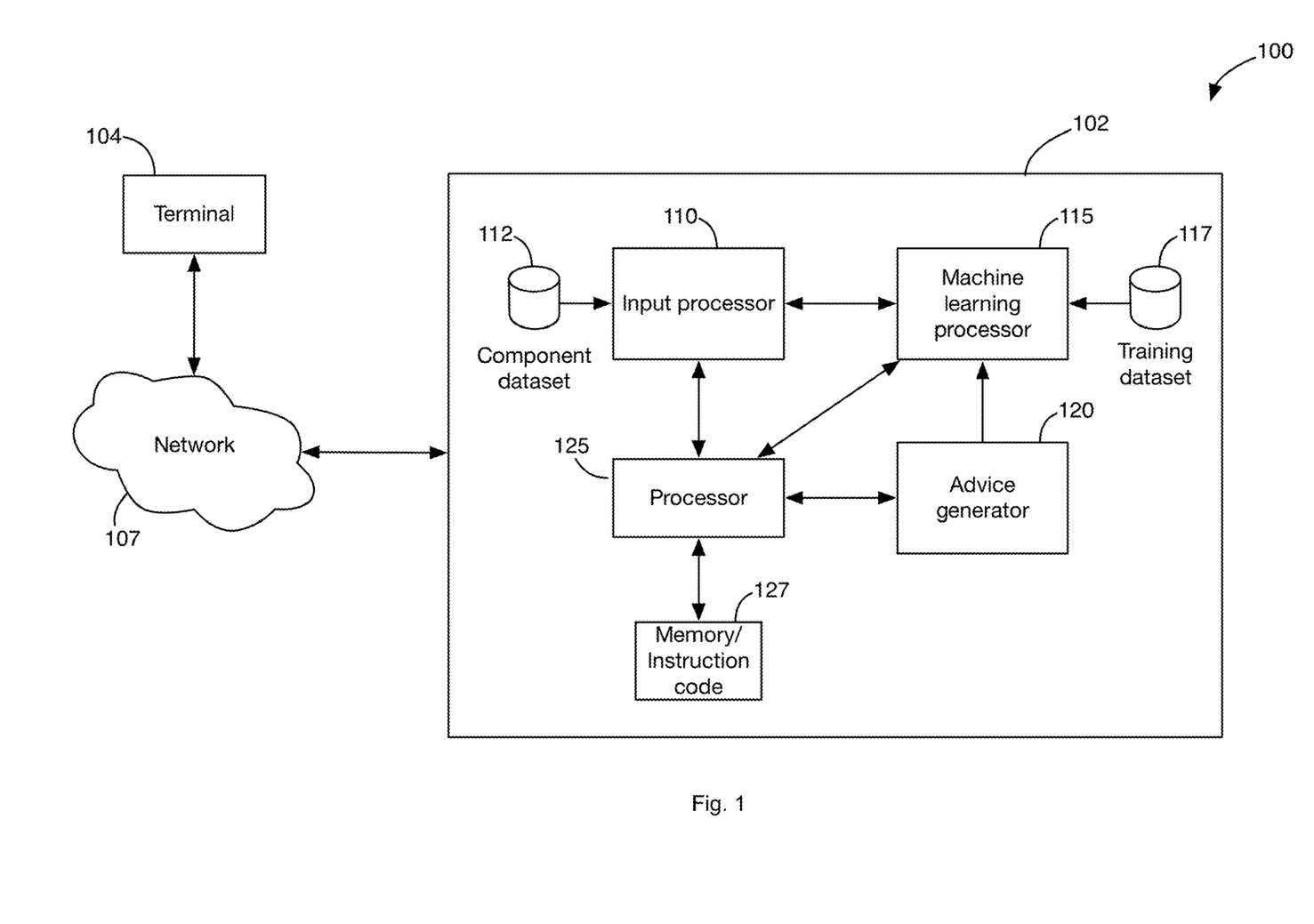
FIG. 1 illustrates an exemplary environment that includes various entities that facilitate generation of an architecture.

FIG. 1 illustrates an exemplary environment 100 that includes various entities that facilitate generation of an architecture diagram. Illustrated in the environment 100 are entities that include an architecture generation system (AGS) 102 and a terminal 104. The AGS 102 and terminal 104 may communicate with one another via a network 107, such as the Internet.

The AGS 102 includes various subsystems that facilitate generating an architecture diagram such as an input processor 110, a machine learning processor (MLP) 115, an advice generator 120. The AGS 102 includes a processor 125 that executes instruction code stored in a memory device 127 for coordinating activities performed between the various subsystems. The AGS 102 may include other subsystems.

It is contemplated that each subsystem may correspond to a stand-alone computer system such as an Intel®, AMD®, or PowerPC® based computer system or a different computer system. The computer systems may include an operating system, such as a Microsoft Windows®, Linux, Unix® or other operating system. It is also contemplated that operations performed on the various subsystems may be combined into a fewer or greater number of subsystems to facilitate speed scaling of the AGS 102, cost reductions, etc.

Figure 2:
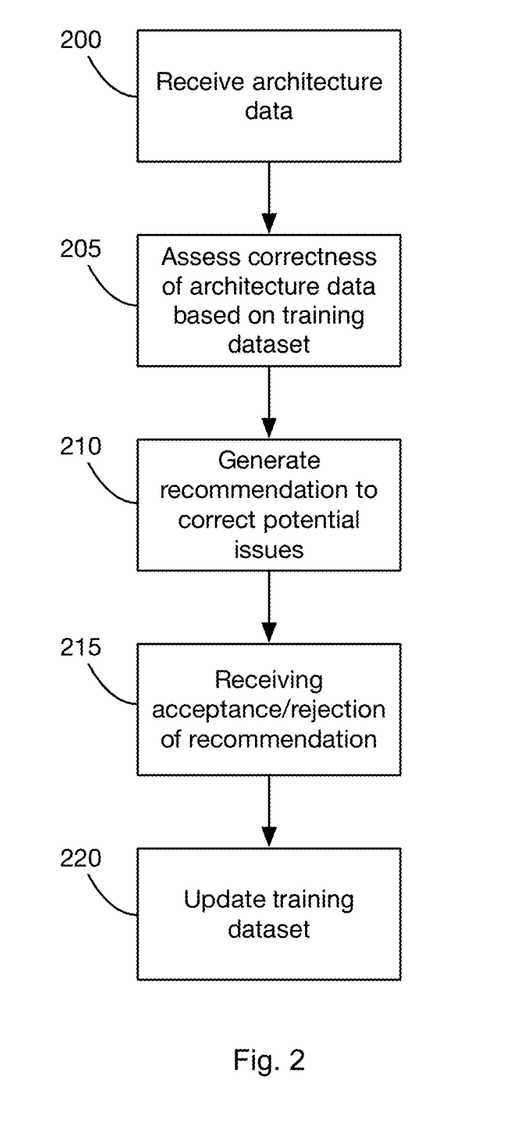
FIG. 2 illustrates operations performed by various entities of the environment.

Operations performed by one or more of the subsystems of the AGS 102 are illustrated in FIG. 2 and are best understood by referencing FIGS. 3-5B. In this regard, the operations may be implemented via instruction code stored in non-transitory computer readable media that resides within the subsystems configured to cause the respective subsystems to perform the operations in the figures.

Figure 3:
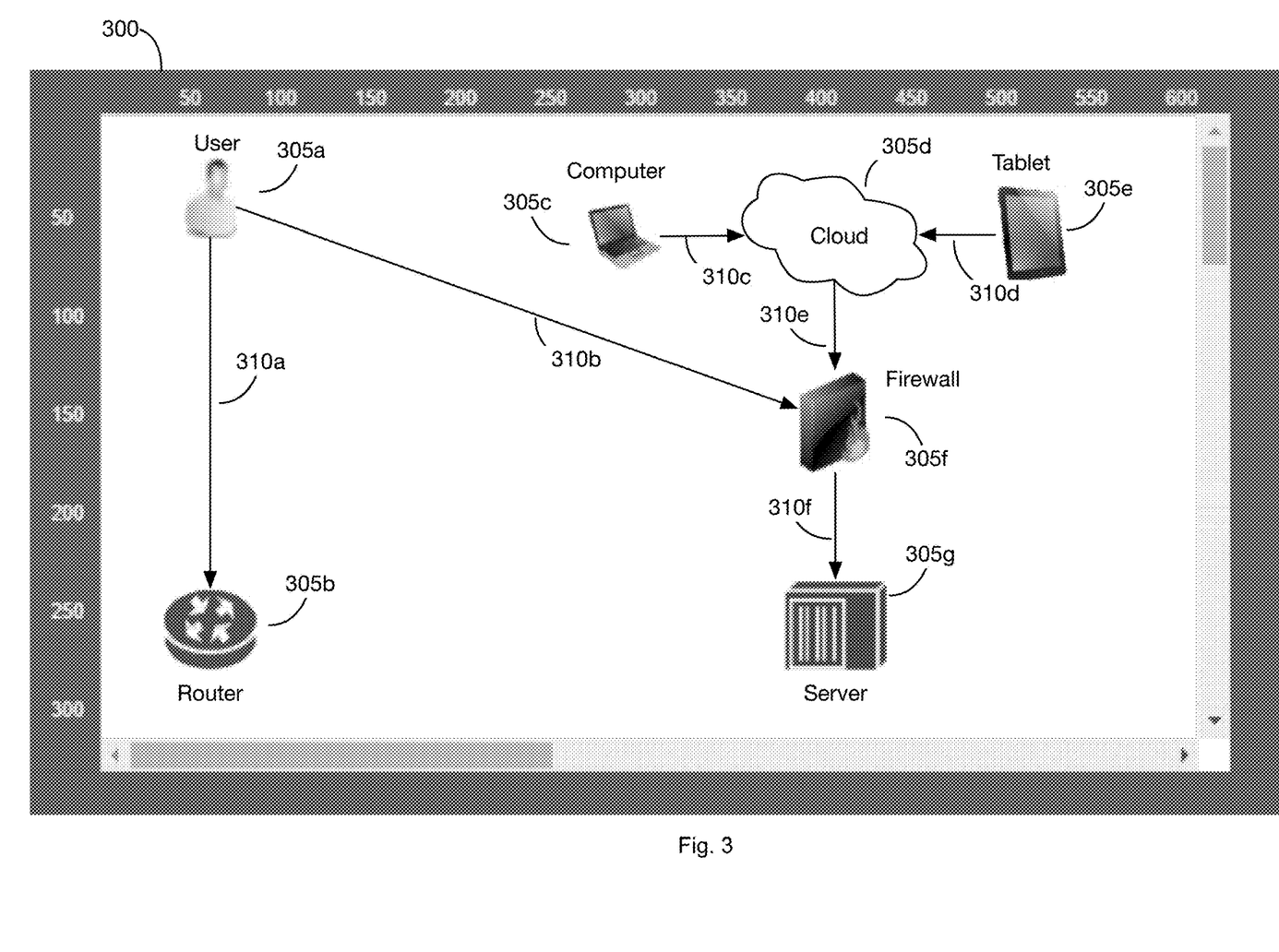
FIG. 3 illustrates an exemplary drawing canvas that facilitates drawing an architecture diagram.

At block 200, the AGS 102 may receive architecture data that defines an architecture diagram. In this regard, the input processor 110 of the AGS 102 may generate one or more user interfaces that facilitate drawing the architecture diagram (See FIG. 3) on, for example, the terminal 107. For example, the input processor 110 may implement a web server that communicates web pages to the terminal 104. As illustrated in FIG. 3, one of the web pages may include a drawing canvas 300 and various controls that facilitate dragging objects 305*a-g* on the canvas and drawing paths 310*a-f* between the objects. The paths represent interconnections (e.g., network connections) between the objects.

After drawing the architecture diagram, a system architect using the terminal 104 may submit the architecture diagram to the AGS 102. The input processor 110 may then convert the architecture diagram into architecture data that is in a format (e.g., SVG, jSON) that facilitates subsequent processing operations of the AGS 102. In alternative implementations, the architecture diagram is continuously submitted to the input processor 110 to facilitate so-called "live" interaction.

Figure 4A:
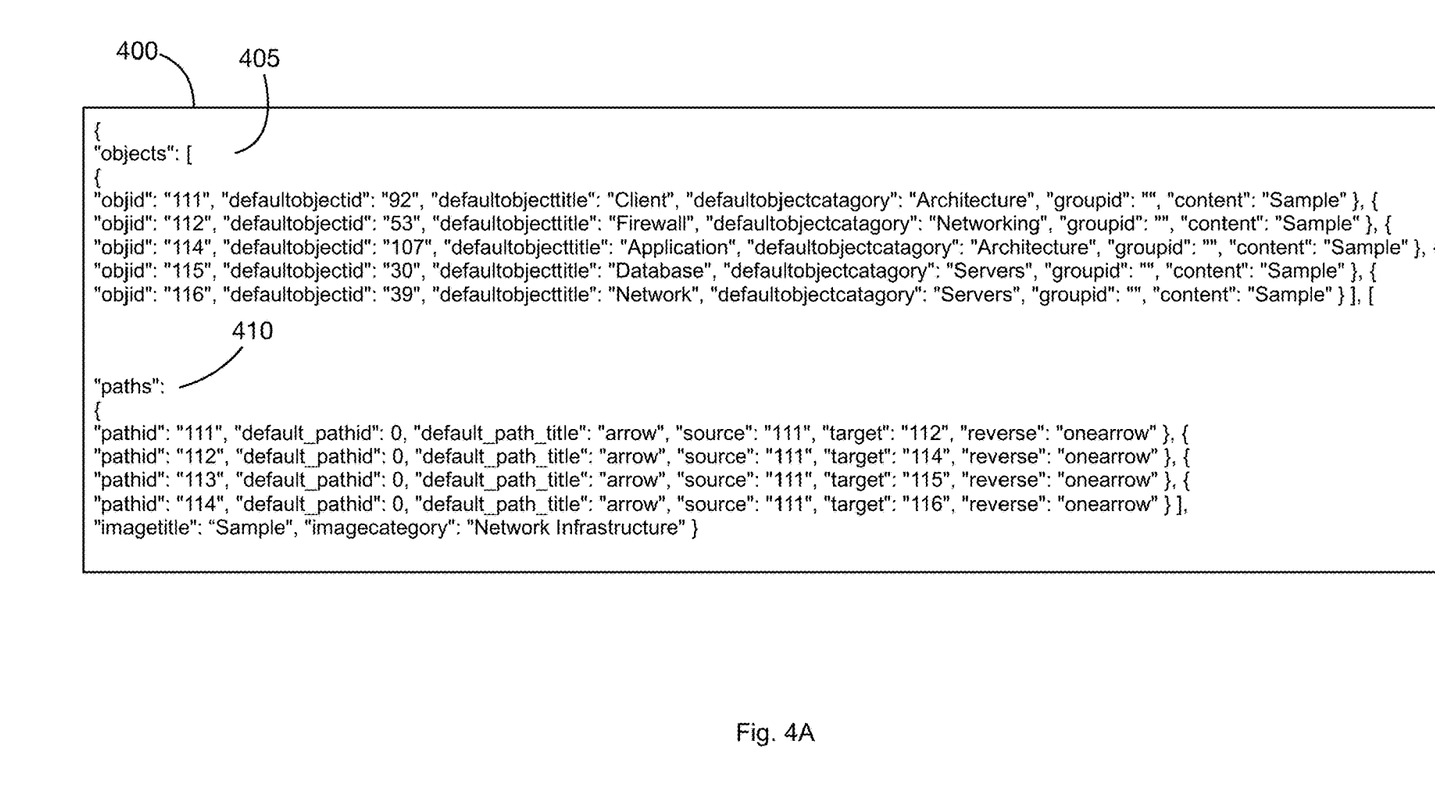
FIG. 4A illustrates exemplary JSON formatted architecture data associated with an architecture diagram.

Referring to FIG. 4A, in one implementation, the input processor 110 converts the architecture diagram into a JSON format. The architecture data 400 may include an array of objects 405 and an array of paths 410. Each item in the objects array 405 corresponds to an object drawn in the architecture diagram (e.g., user, server, firewall). Each item in the paths array 410 corresponds to an interconnection between objects of the architecture diagram. Each item in the objects array 405 and the paths array 410 includes information in the form of key/value pairs.

In an exemplary implementation, each item in the objects array 405 includes keys named ObjectID, DefaultObjectID, DefaultObjectTitle, DefaultObjectCatagory, GroupID, and Content. The ObjectID key is paired to a dynamically generated ID number that is incremented for every object added to the architecture diagram. The DefaultObjectID key is paired to a static ID number that is predefined and associated with a given object. The DefaultObjectTitle key is paired to the title of a given object. The DefaultObjectCatagory key is paired to a category under which the object belongs. The Content key is paired to text that may be specified by the system architect using the terminal 104.

Each item in the paths array 410 includes keys named PathID, DefaultPathID, DefaultPathTitle, Source, Target, and Reverse. The PathID key is paired to a dynamically generated ID number that is incremented every time a path is added. The DefaultPathID key is paired to a static ID number that is predefined and associated with a given path. The DefaultPathTitle key is paired to a tittle for a given path. The Source key is paired to the ObjectID value for the object from which the path begins. The Target key is paired to the ObjectID value for the object at which the path ends. The Reverse key is paired to a value that corresponds to the type of arrow associated with the path.

After conversion of the architecture diagram into the architecture data 400, the input processor 110 may store the architecture data 400 into a database 112.

Returning to FIG. 2, at block 205, the correctness of the architecture data 400 in the database 112 associated with the architecture diagram may be assessed by the MLP 115. In this regard, the MLP 115 may implement a supervised learning algorithm such as LogisticRegression and classification that attempts to classify the ways in which objects in the architecture diagram are interconnected as correct or incorrect based on a training dataset 117. Along with this it also predicts the Next Most suitable Object, which could be Added in the while Drawing an architectural diagram.

Figure 4B:
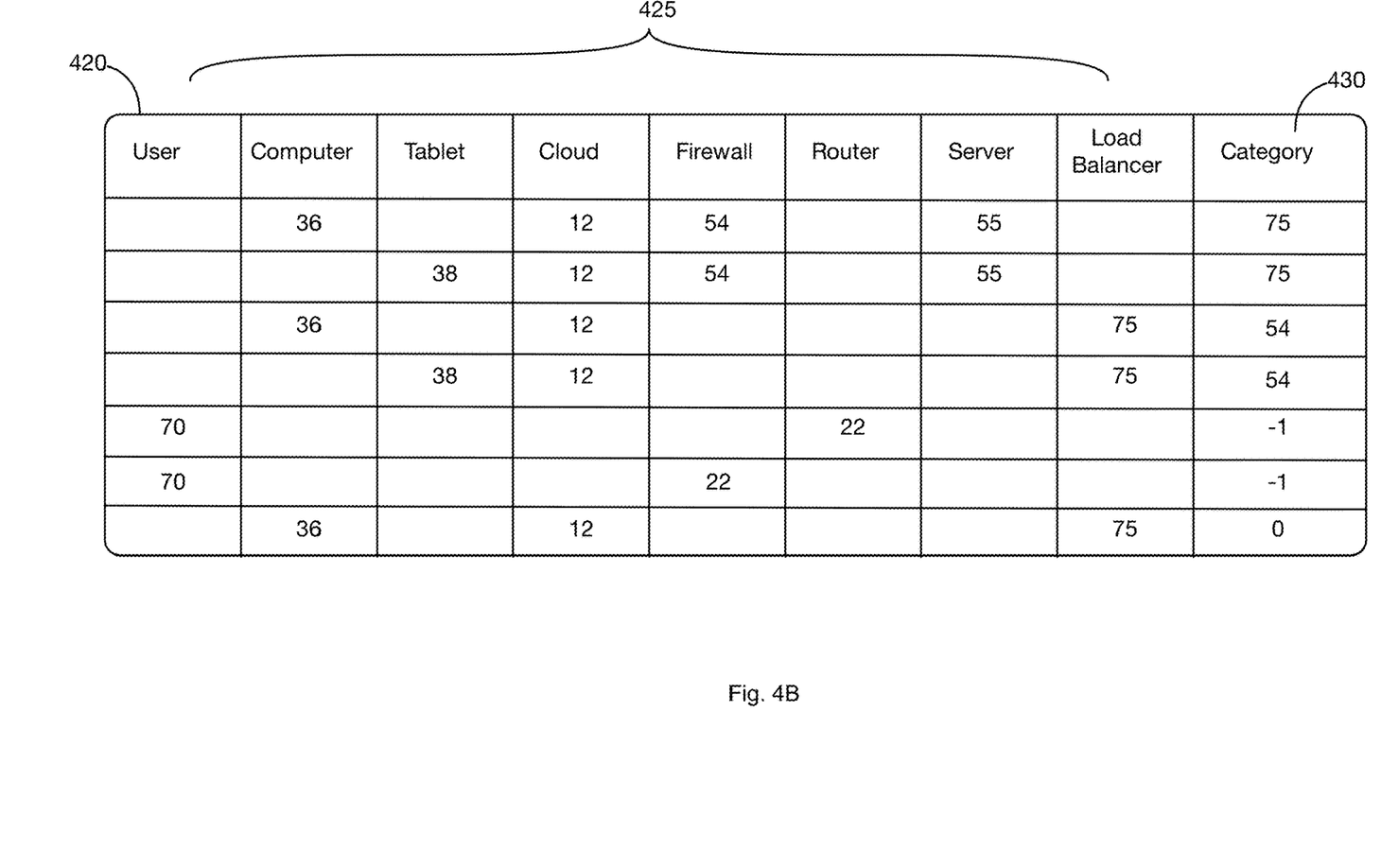
FIG. 4B illustrates exemplary training data that may reside in an exemplary training dataset.

FIG. 4B illustrates a portion of training data 420 that may reside in an exemplary training dataset 420. The training data 420 may be conceptualized as including two parts, namely features 425 and categories 430. The features 425 are key to creating a pattern that facilitates predicting the category to which an arrangement of objects in the architecture diagram belong.

The numbers in the cells generally correspond to previously defined object IDs associated with objects that may be placed in the architecture diagram. Table 1 illustrates exemplary object IDs that may have been previously associated with various objects.

TABLE 1

| Object Name | Object ID |
|---|---|
| User | 70 |
| Computer | 36 |
| Tablet | 38 |
| Cloud | 12 |
| Firewall | 54 |
| Router | 22 |
| Server | 55 |
| Load balancer | 75 |
| ... | ... |

The values associated with the DefaultObjectID key for the objects in the architecture data 400 may correspond to the previously defined object IDs.

The training data 420 is used to train the MLP 115 to classify the interconnected objects in the architecture as belonging to a pre-defined category. For example, the value in the category column 430 may indicate the object ID of an object that should be used as an alternative to an object that was placed in the architecture diagram. According to the first row in the training data 420, when a computer object (ID 35) is connected to cloud object (ID 12), which is connected to a firewall object (ID 54), which is connected to a server object (ID 55), the category indicates 75. This would indicate that the object with ID 75 (i.e., Load balancer) should be included in the arrangement.

According to the third row, when a computer object (ID 35) is connected to cloud object (ID 12), which is connected to a load balancer object (ID 75), the category indicates 54. This would indicate that the object with ID 54 (i.e., Firewall) should be included in the arrangement.

According to the fifth row, when a user object (ID 70) is connected to a router object (ID 22), the category indicates −1. This might be utilized to indicate that the path between the user object (ID 70) and the router object (ID 22) is incorrect.

According to the seventh row, a computer object (ID 36) is connected to a cloud object (ID 12), which is connected to a load balancer object (ID 75), and the category indicates 0. This might be utilized to indicate that this arrangement is acceptable.

As noted above, the training data 420 illustrated in FIG. 4B is merely exemplary. The visual representation of the training data 420 in FIG. 4B is just one of many ways that the training data 420 may be visualized.

The assessment determination made by the MLP 115 as to the correctness of the architecture data is communicated to the advice generator.

Returning to FIG. 2, at block 210, the advice generator 120 generates recommendations for correcting the architecture diagram based on the assessment determination generated by the MLP 115. The recommendations are communicated to the terminal 104 to facilitate review by the system architect using the terminal 104.

Figure 5A:
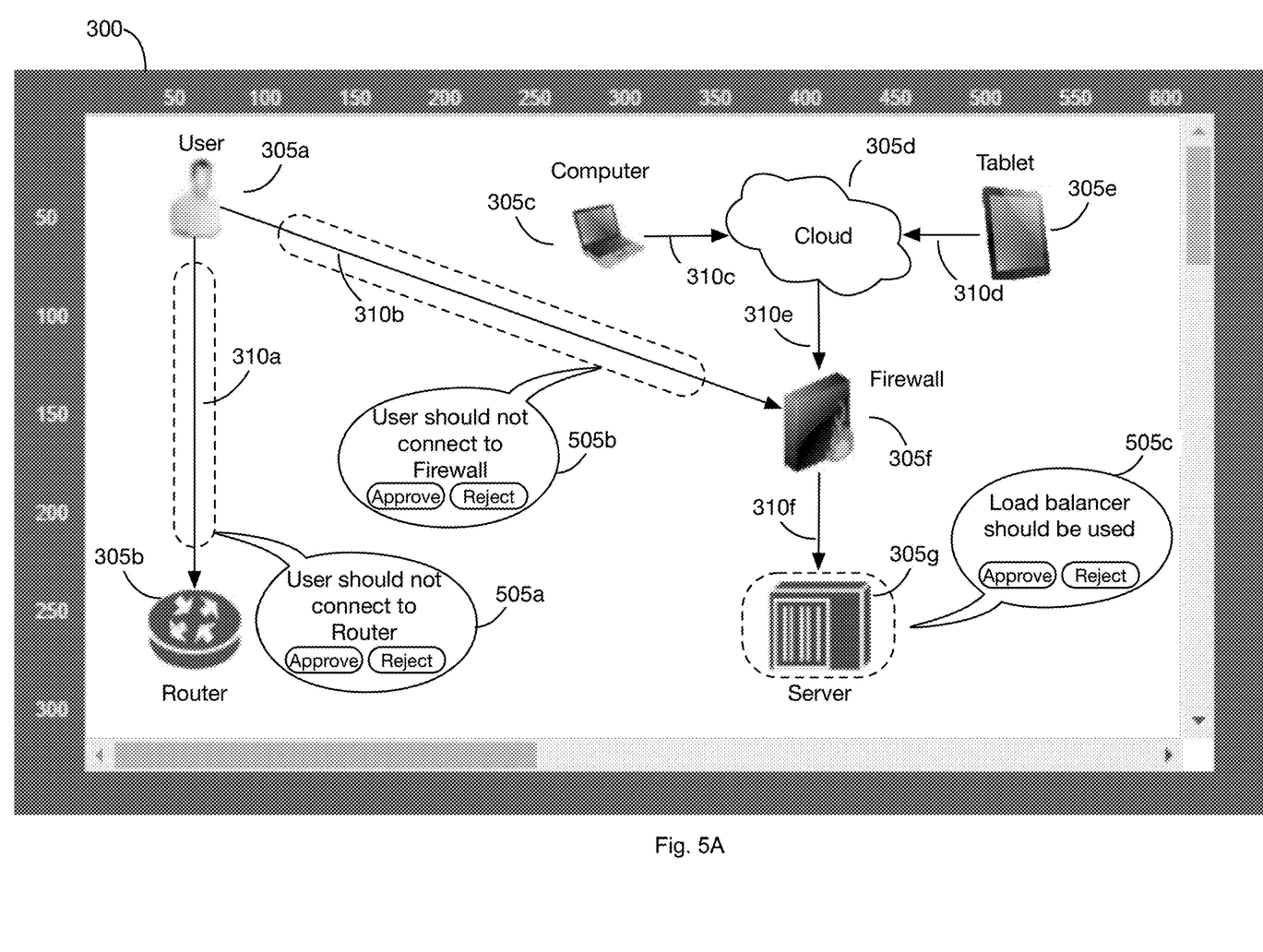
FIGS. 5A and 5B illustrate the exemplary drawing after recommendation for correcting information has been provided.
Figure 5B:
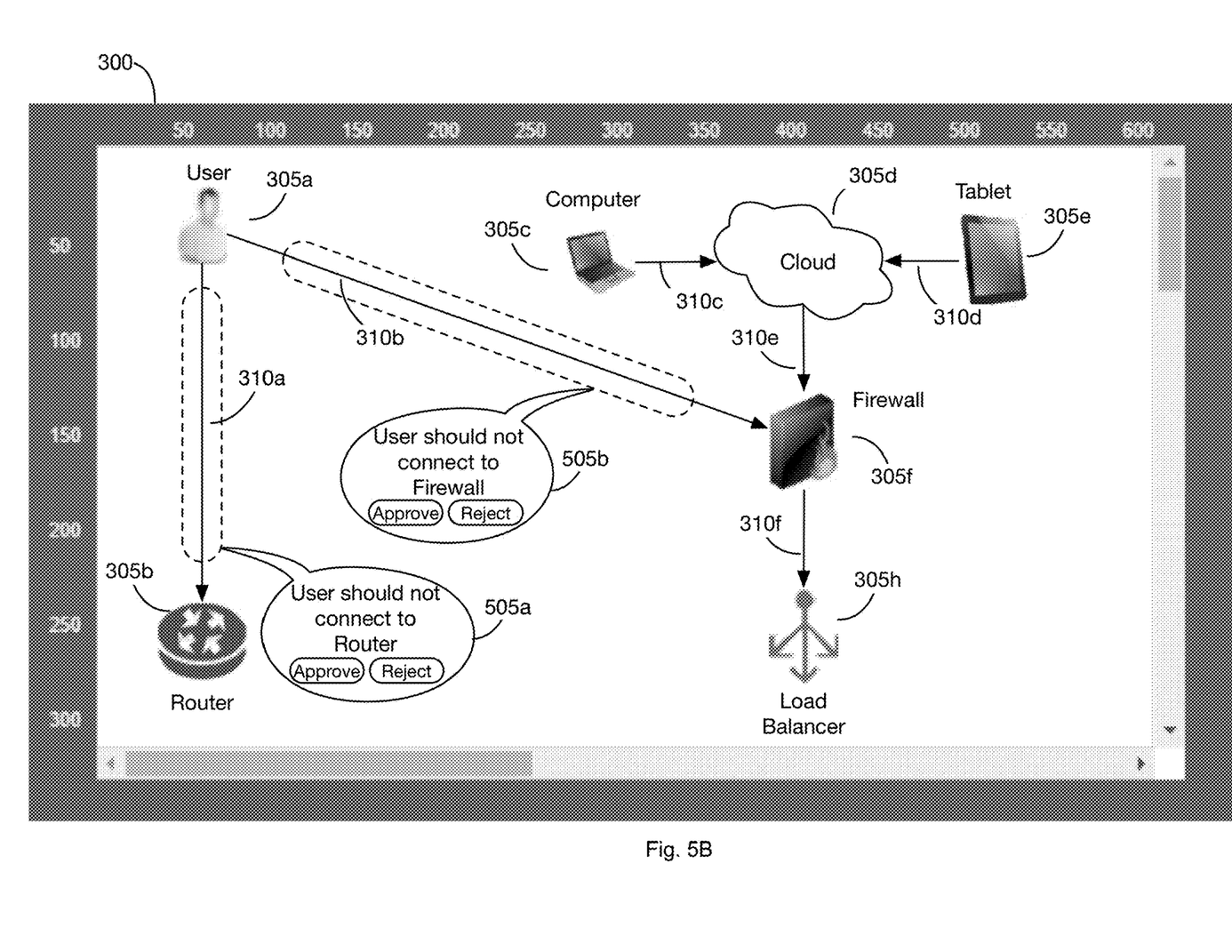

As illustrated in FIGS. 5A and 5B, in one implementation the recommendations are provided in widgets that facilitate both presentation of a textual representation of the recommendation and reception of an approval or rejection indication from the system architect. For example, a first recommendation 425a may indicate that the illustrated user object should not be connected directly to the illustrated router object. A second recommendation 505b may indicate that the illustrated user object should not be connected directly to the illustrated firewall object. These recommendations may have been generated at least in part based on the fifth and sixth rows in the training data 420.

A third recombination 505c may indicate that a load balancer object should be used instead of the illustrated server object 305gt. This recommendation may have been generated at least in part based on the first and second rows in the training data 420.

As noted, the system architect using the terminal may approve or reject the recommendations. Approval of the first and second recommendations 505a, b may result in deletion of the corresponding path segments 310a, b. Approval of the third recommendation 505c may result in replacement of the server object 305g with a load balancer object 305h, as illustrated in FIG. 4B.

Returning to FIG. 2, at block 215, the approval/rejection indication may be received by the AGS 102. If the recommendation is approved, then the training data may populated by an additional column. This in turn increases the likelihood that the same recommendation will be made in the future for the same circumstances. When the recommendation is not approved, the training dataset 117 may be updated with an entry to indicate the response. This in turn decreases the likelihood that the same recommendation will be made in the future for the same circumstances. For example, the category for the seventh row in the training data 420 illustrated in FIG. 4B is a zero to indicate that the combination of connections represented in by the row should not be recommended. This feedback results in better assessment by the MLP 115 and ultimately better/more relevant recommendations by the advice generator 120.

Figure 6:
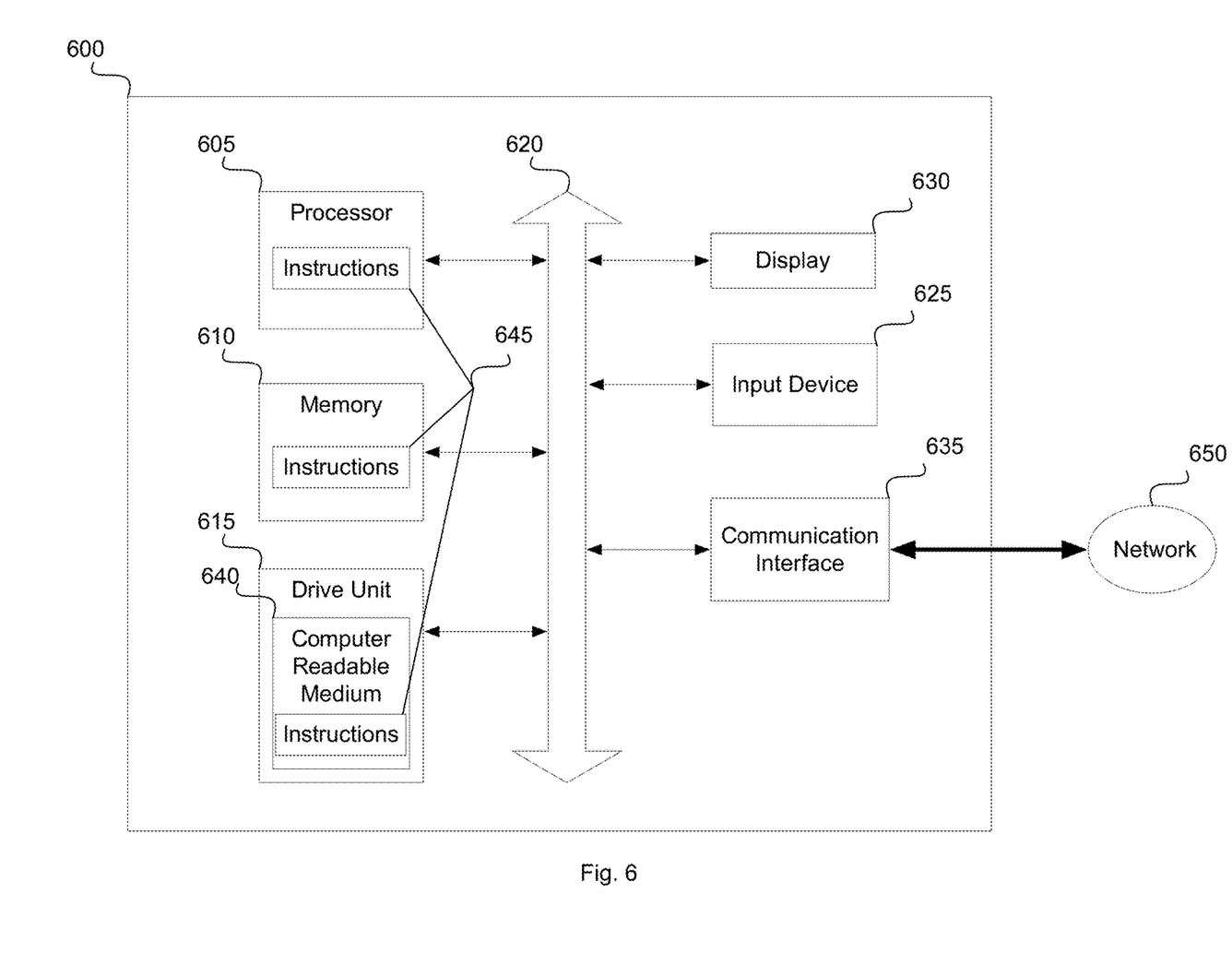
FIG. 6 illustrates an exemplary computer system that may form part of or implement the systems described in the figures or in the following paragraphs.

FIG. 6 illustrates a computer system 600 that may form part of or implement the systems described above. The computer system 600 may include a set of instructions 645 that the processor 605 may execute to cause the computer system 600 to perform any of the operations described above. The computer system 600 may operate as a standalone device or may be connected, e.g., using a network, to other computer systems or peripheral devices.

In a networked deployment, the computer system 600 may operate in the capacity of a server or as a client-user computer in a server-client user network environment, or as a peer computer system in a peer-to-peer (or distributed) network environment. The computer system 600 may also be implemented as or incorporated into various devices, such as a personal computer or a mobile device, capable of executing the instructions 645 (sequential or otherwise) that specify actions to be taken by that machine. Further, each of the systems described may include any collection of subsystems that individually or jointly execute a set, or multiple sets, of instructions to perform one or more computer functions.

The computer system 600 may include one or more memory devices 610 on a bus 620 for communicating information. In addition, code operable to cause the computer system to perform any of the operations described above may be stored in the memory 610. The memory 610 may be a random-access memory, read-only memory, programmable memory, hard disk drive or any other type of memory or storage device.

The computer system 600 may include a display 630, such as a liquid crystal display (LCD), a cathode ray tube (CRT), or any other display suitable for conveying information. The display 630 may act as an interface for the user to see the functioning of the processor 605, or specifically as an interface with the software stored in the memory 610 or in the drive unit 615.

Additionally, the computer system 600 may include an input device 625, such as a keyboard or mouse, configured to allow a user to interact with any of the components of system 600.

The computer system 600 may also include a disk or optical drive unit 615. The disk drive unit 615 may include a computer-readable medium 640 in which the instructions 645 may be stored. The instructions 645 may reside completely, or at least partially, within the memory 610 and/or within the processor 605 during execution by the computer system 600. The memory 610 and the processor 605 also may include computer-readable media as discussed above.

The computer system 600 may include a communication interface 635 to support communications via a network 650. The network 650 may include wired networks, wireless networks, or combinations thereof. The communication interface 635 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A system for generating an architecture diagram, the system comprising:
   an input processor configured to:
      generate a graphical user interface (GUI) viewable on the terminal that facilitates a user drawing an architecture diagram on the GUI displayed on the terminal, the architecture diagram comprising an architecture having a plurality of entities and a plurality of paths that interconnect the entities; and
      receive, from the terminal, entity data associated with the plurality of entities of the architecture and path data associated with the plurality of paths that correspond to the interconnections between the plurality of entities, wherein the entity data and path data are converted by the input processor into a computer processable format from the plurality of entities and plurality of paths drawn by the user on the GUI on the terminal depicting the architecture;
   a machine learning processor that utilizes a training dataset to assess whether the entities defined by the entity data are correctly interconnected as defined by the path data,
   wherein the training dataset includes a matrix comprising features and categories, each row of the matrix including cells containing features that include values corresponding to pre-defined object IDs associated with the architecture entities in a path and a cell containing a value corresponding to a predefined assessment category, the predefined assessment category including an object ID of an entity missing in the path, an incorrect path indicator or a correct path indicator,
   wherein the machine learning processor includes machine learning algorithms that are trained with the training dataset to classify the interconnected architecture entities as corresponding to the predefined assessment category, and
   wherein the machine learning processor generates an assessment that indicates a proposed change to either insert a new entity between entities of the architecture in a path or to replace an existing entity of the architecture with the new entity in a path based on the predefined assessment category determined to correspond to the received entity data for that path; and
   an advice generator that receives the assessment from the machine learning processor, prepares a recommendation based on the assessment, and communicates the recommendation to the terminal, wherein the recommendation includes the proposed change displayed on the GUI and includes a selectable button for the user to accept or reject the proposed change;
   wherein the input processor is further configured to receive an indication of the acceptance or rejection of the proposed change based on the button selection by the user, and in response to the acceptance selection, automatically update the architecture diagram on the GUI with the proposed change.

2. The system according to claim 1, wherein the advice generator is further configured to:
   receive an indication of acceptance or rejection of the recommendation from the terminal; and
   when the recommendation is rejected, the advice generator is configured to communicate an indication to the machine learning processor that the proposed change in the recommendation was rejected,
   wherein in response to the indication that the proposed change was rejected, the machine learning processor is further configured to update information in the training dataset to reflect that the proposed change was rejected.

3. The system according to claim 2, wherein in addition to the proposed change to either insert a new entity between entities of the architecture or to replace an existing entity of the architecture with the new entity, the assessment indicates a proposed change to delete a path between entities of the architecture.

4. The system according to claim 1, wherein the entity data and path data are converted to a JavaScript Object Notation (JSON) format.

5. The system according to claim 1, wherein the machine learning processor utilizes statistical classification algorithms to classify the entity data and path data as belonging to a class of interconnected entities defined in the training dataset.

6. A non-transitory computer readable medium that includes instruction code that facilitates generating an architecture diagram, the instruction code being executable by a machine for causing the machine to perform acts comprising:
   generating, on a terminal, a graphical user interface (GUI) that facilitates a user drawing an architecture diagram on the GUI displayed on the terminal, the architecture diagram comprising an architecture having a plurality of entities and a plurality of paths that interconnect the entities;
   receiving, from the terminal, entity data associated with the plurality of entities of the architecture and path data associated with the plurality of paths that correspond to the interconnections between the plurality of entities, wherein the entity data and path data are converted to a computer processable format from the plurality of entities and plurality of paths drawn by the user on the GUI on the terminal depicting the architecture;
   controlling a machine learning processor that utilizes a training dataset to assess whether the entities defined by the entity data are correctly interconnected as defined by the path data,
   wherein the training dataset includes a matrix comprising features and categories, each row of the matrix including cells containing features that include values corresponding to pre-defined object IDs associated with the architecture entities in a path and a cell containing a value corresponding to a predefined assessment category, the predefined assessment category including an object ID of an entity missing in the path, an incorrect path indicator or a correct path indicator,
   wherein the machine learning processor includes machine learning algorithms that are trained with the training dataset to classify the interconnected architecture entities as corresponding to the predefined assessment category, and
   wherein the machine learning processor generates an assessment that indicates a proposed change to either insert a new entity between entities of the architecture in a path or to replace an existing entity of the architecture with the new entity in a path based on the predefined assessment category determined to correspond to the received entity data for that path; and preparing a recommendation based on the assessment, and communicating the recommendation to the terminal, wherein the recommendation includes the proposed change displayed on the GUI and includes a selectable button for the user to accept or reject the proposed change;

wherein the input processor is further configured to receive an indication of the acceptance or rejection of the proposed change based on the button selection by the user, and in response to the acceptance selection, automatically update the architecture diagram on the GUI with the proposed change.

7. The non-transitory computer readable medium according to claim 6, wherein the instruction code is executable to cause the machine to perform further acts comprising:
receiving an indication of acceptance or rejection of the recommendation from the terminal; and
when the recommendation is rejected, communicate an indication to the machine learning processor that the proposed change in the recommendation was rejected,
wherein in response to the indication that the proposed change was rejected, the machine learning processor updates information in the training dataset to reflect that the proposed change was rejected.

8. The non-transitory computer readable medium according to claim 7, wherein in addition to the proposed change to either insert a new entity between entities of the architecture or to replace an existing entity of the architecture with the new entity, the assessment indicates a proposed change to delete a path between entities of the architecture.

9. The non-transitory computer readable medium according to claim 6, wherein the entity data and path data are converted to a JavaScript Object Notation (JSON) format.

10. The non-transitory computer readable medium according to claim 6, wherein the machine learning processor utilizes statistical classification algorithms to classify the entity data and path data as belonging to a class of interconnected entities defined in the training dataset.

11. A method for generating an architecture diagram, the method comprising:
generating, on a terminal by an input processor, a graphical user interface (GUI) that facilitates a user drawing an architecture diagram on the GUI displayed on the terminal, the architecture diagram comprising an architecture having a plurality of entities and a plurality of paths that interconnect the entities;
receiving, by the input processor and from the terminal, entity data associated with the plurality of entities of the architecture and path data associated with the plurality of paths that correspond to the interconnections between the plurality of entities, wherein the entity data and path data are converted by the input processor to a computer processable format from the plurality of entities and plurality of paths drawn by the user on the GUI on the terminal depicting the architecture;
controlling a machine learning processor that utilizes a training dataset to assess whether the entities defined by the entity data are correctly interconnected as defined by the path data,
wherein the training dataset includes a matrix comprising features and categories, each row of the matrix including cells containing features that include values corresponding to pre-defined object IDs associated with the architecture entities in a path and a cell containing a value corresponding to a predefined assessment category, the predefined assessment category including an object ID of an entity missing in the path, an incorrect path indicator or a correct path indicator,
wherein the machine learning processor includes machine learning algorithms that are trained with the training dataset to classify the interconnected architecture entities as corresponding to the predefined assessment category, and
wherein the machine learning processor generates an assessment that indicates a proposed change to either insert a new entity between entities of the architecture in a path or to replace an existing entity of the architecture with the new entity in a path based on the predefined assessment category determined to correspond to the received entity data for that path; and
preparing, by an advice generator, a recommendation based on the assessment, and communicating the recommendation to the terminal, wherein the recommendation includes the proposed change displayed on the GUI and includes a selectable button for the user to accept or reject the proposed change;
wherein the input processor is further configured to receive an indication of the acceptance or rejection of the proposed change based on the button selection by the user, and in response to the acceptance selection, automatically update the architecture diagram on the GUI with the proposed change.

12. The method according to claim 11, wherein the method further comprises:
receiving an indication of acceptance or rejection of the recommendation from the terminal; and
when the recommendation is rejected, communicating, by the advice generator, an indication to the machine learning processor that the proposed change in the recommendation was rejected,
wherein in response to the indication that the proposed change was rejected, the machine learning processor updates information in the training dataset to reflect that the proposed change was rejected.

13. The method according to claim 12, wherein in addition to the proposed change to either insert a new entity between entities of the architecture or to replace an existing entity of the architecture with the new entity, the assessment indicates a proposed change to delete a path between entities of the architecture.

14. The method according to claim 11, wherein the entity data and path data are converted to a JavaScript Object Notation (JSON) format.

\* \* \* \* \*